United States Patent Office 3,274,065
Patented Sept. 20, 1966

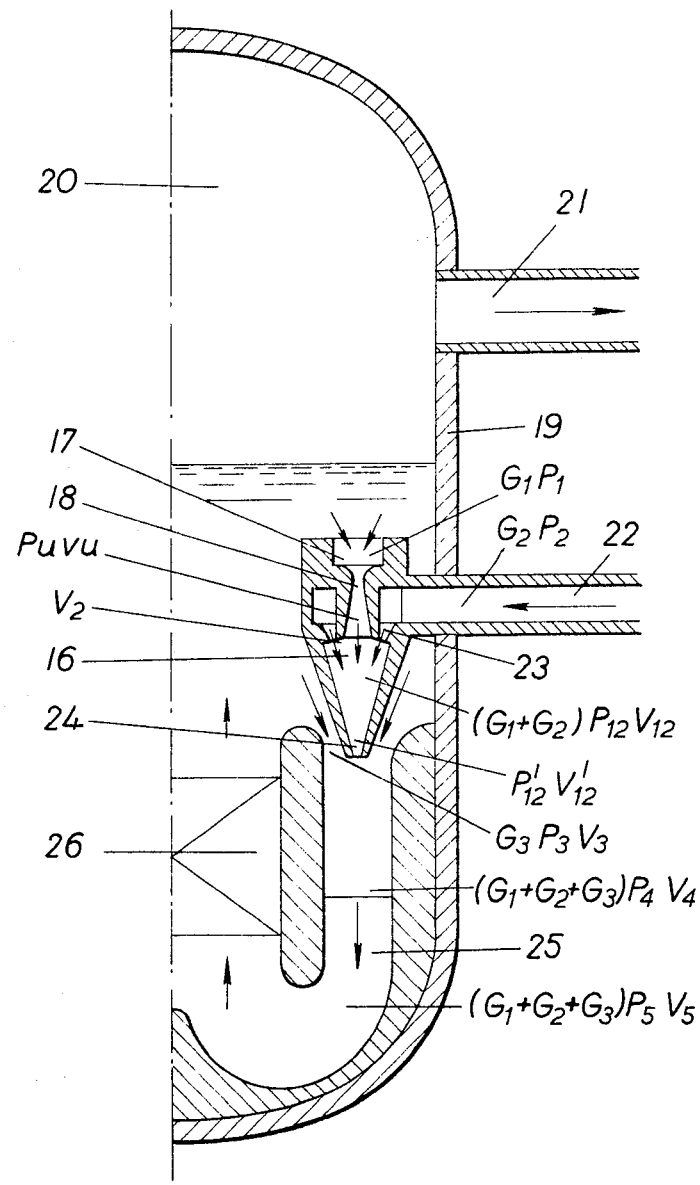

3,274,065
NUCLEAR REACTOR WITH JET PUMP ARRANGEMENT FOR OBTAINING FORCED LIQUID CIRCULATION
Birger Christian Kierulf and Thörbjörn Westrum, Kjeller, near Lillestrom, Norway, assignors to Institutt For Atomenergi, near Lillestrom, Norway
Filed May 14, 1963, Ser. No. 280,402
Claims priority, application Norway, May 18, 1962, 144,430; Mar. 27, 1963, 148,049
2 Claims. (Cl. 176—61)

The present invention relates to a method for obtaining forced circulation of a liquid in thermo dynamic systems in connection with nuclear reactors, vapour generators, heat pumps and similar devices.

The method according to the invention is particularly suitable for pressurized water reactors and boiling water reactors and one of the objects of the invention is to satisfy the severe requirements to stability and specific power set to water cooled reactors.

Improved cooling of the fuel elements in a reactor core and increased flow stability of the coolant is usually obtained by adjustment of the natural circulation conditions. For the purpose of obtaining a still further improvement of the circulation of a liquid which is used both as a moderator and as a coolant, various arrangements have been suggested, the arrangements being based on the water jet pump principle. Various injector devices have also been suggested, similar to the well known feed water injection nozzles of steam boilers.

Thus, the German Auslegeschrift 1,124,527 describes the application of a vapour injector for liquid circulation in a heat exchanger circuit.

The British specification No. 796,966 describes a device for the intensification of the natural water circulation through fuel element tubes by the arrangement of a nozzle at the lower end of each tube. Water which is derived from the external circuit is pumped out of the nozzles and causes the water in the reactor tank to circulate through the fuel element tubes in accordance with the water jet pump principle.

The German Auslegeshcrift No. 1,048,363 describes similar arrangement comprising injection nozzles at the lower end of the fuel element tubes for the purpose of intensifying the water flow through the tubes.

The German Auslegeshcrift No. 1,048,363 describes how a moderator circuit is maintained by making a forced coolant circuit to induce circulation in the moderator circuit by the use of the water jet pump principle.

According to the invention, the flow conditions in a liquid cooled nuclear reactor are stabilised by means of a fluid volume which is derived from the coolant medium in the reactor tank and flows into a chamber which is also fed with a liquid volume from a separate circuit. On entering the chamber the fluid is in the form of vapour or a liquid vapour mixture and the vapour condenses completely or partially by means of the liquid from the separate circuit, this liquid having a lower temperature than the coolant medium in the reactor tank. The fluid mixture thus formed in the chamber flows towards a nozzle in a converging part of the chamber and through this nozzle into a directed passage for the coolant medium in the reactor tank and effects a substantial increase in the liquid circulation.

Among the advantages of the method according to the invention, the following may be mentioned in indiscriminate sequence.

(a) The arrangement can be built with reduced space requirements, as forced internal circulation is obtained without additional external installations. This is of especially great importance in connection with reactor plants.

(b) Efficient circulation is obtained without an internal pump with moveable parts.

(c) All energy used for circulation remains in the system.

(d) Increased flow stability is obtained, thus making reactors more attractive for marine installations.

(e) The installation is simple and rugged.

(f) The reactivity of a reactor can be varied by adjusting the temperature and/or the pressure to the liquid in the external circuit.

Two embodiments of the method according to the invention are now to be described with references to the accompanying drawings, in which FIGURE 1 is a simplified process diagram of the coolant circuit of a nuclear reactor.

FIGURE 3 is a sectional view of a combined water-injector water-jet pump unit enclosed in a boiling water nuclear reactor.

Figure 1:
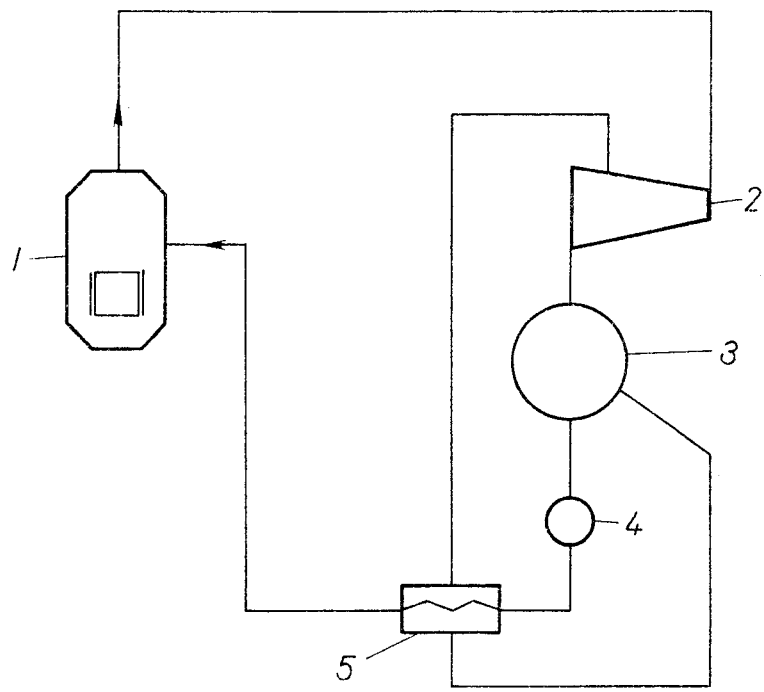

In FIGURE 1, 1 is a boiling water nuclear reactor. The reactor supplies practically saturated water vapour to a steam turbine 2. Upon expansion in the turbine, the steam is condensed in the condenser 3, and the condensate is returned to the reactor by a pump 4 through a pre-heater 5.

Usually, the condensate, when introduced into the reactor tank, is mixed with the internally re-circulating moderator, and part of the reactor power is used to heat the condensate to the saturation temperature of the vapour. This pre-heating of the condensate may require an amount of energy of about one-fourth of the reactor power. According to the invention, part of this energy is transformed into kinetic energy for forced circulation of the fluid in the reactor tank by means of units such as illustrated in FIGURES 2 and 3.

Figure 2:
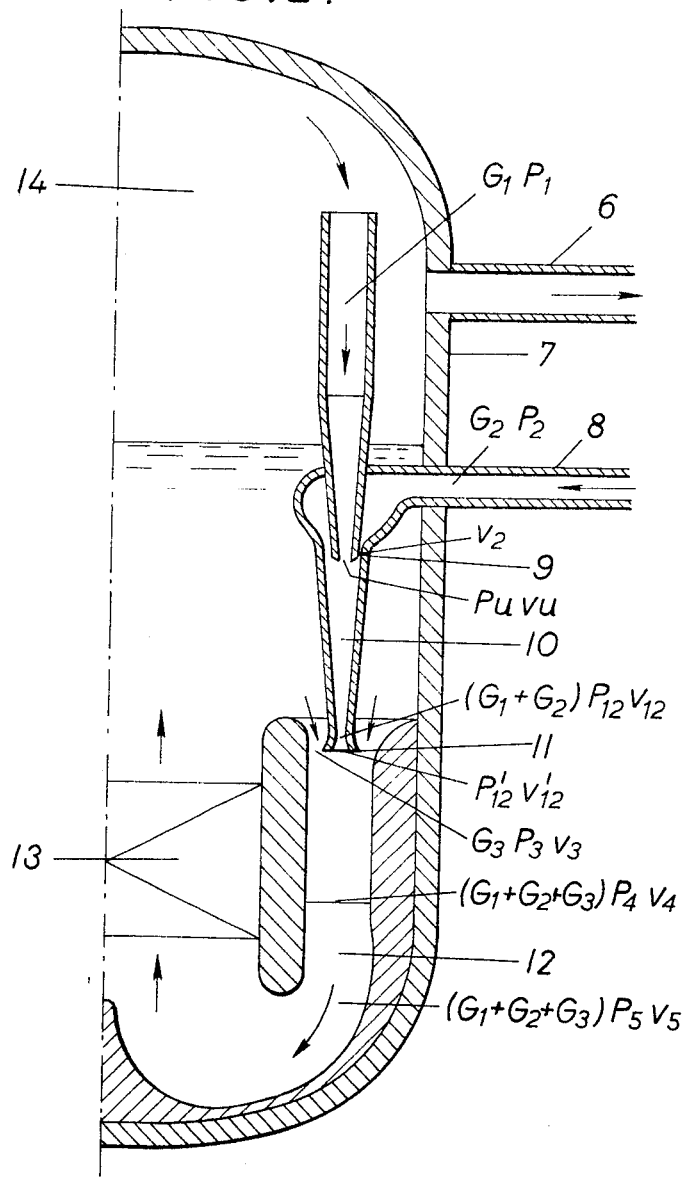
FIGURE 2 is a sectional view of a combined vapour-injector water-jet-pump unit enclosed in a boiling water nuclear reactor.

In FIGURE 2, 6 is a tubing carrying vapour from a nuclear reactor 7. After having passed an external circuit, similar to that shown in FIGURE 1 condensate is pumped at a mass flow rate and $G_2$ at a pressure $P_2$ through a tubing 8 and a narrow slot 9 into a mixing chamber 10. The condensate has a temperature below the saturation temperature. At the inlet to the mixing chamber the pressure energy at the pressure $P_2$ in the condensate is partly transformed into kinetic energy accompanied by a corresponding pressure reduction, and the condensate flows into the mixing chamber at a velocity $v_2$. As a consequence of the pressure reduction, sub-pressure is established in the mixing chamber and part of the heat content of a vapour at the pressure $P_1$ is transformed into kinetic energy as the vapour enters the mixing chamber at a high velocity $v_u$ and a mass flow rate $G_1$. The vapour is completely or partially condensed in the mixing chamber by means of the condensate with which it becomes mixed. At the same time, an impulse exchange takes place. Just before the mixture formed by the condensate and the vapour, entering at mass flow rates $G_2$ and $G_1$ respectively, arrives at the outlet of the mixing chamber, it has a velocity $v_{12}$ and a pressure $P_{12}$. The kinetic energy obtained, is again partially transformed into pressure energy and the pressure $P_{12}$, which is lower than the reactor pressure, is re-established to $P'_{12}$ in a diffusor in a nozzle 11. Depending on mixing chamber design, the pressure $P'_{12}$ may also be established without a diffusor 11. The mixture at a mass flow rate $G_1+G_2$ leaves the nozzle at a velocity $v'_{12}$. Hereby circulating water at a mass flow rate $G_3$ and at a pressure $P_3$ is given a velocity $v_3$. The mixture flows into a diffusor 12 at a velocity $v_4$, pressure $P_4$ and a mass flow rate $G_1+G_2+G_3$. Herein the pressure is built up to $P_5$ and the mixture flows through the reactor core 13.

After having passed through the reactor core, the steam-water mixture is separated. The water passes to the slot around the nozzle 11 and circulates as described above, while the vapour rises into the vapour space 14. From the vapour space 14, part of the vapour is passed into the mixing chamber 10, while the rest is passed out of the reactor tank through the tube 6.

By adjusting the temperature and/or the pressure of the returned condensate, the flow velocity through the reactor core, and consequently the vapour volume in the reactor core, may be varied. In this manner, the reactivity of the reactor may be controlled.

As an illustration of the advantages of the method described in FIGURE 2 reference may be made to a reactor with thermal power of about 53 mw. an operating pressure of 52 atm. a temperature of the return condensate of 130° C. and a consumption for the pre-heating of the condensate of 13 mw. An inlet velocity to the reactor core of about 2.5 m./sec. can be obtained, while in a boiling reactor having natural circulation an inlet velocity of about 1 m./sec. can be obtained.

In comparison, it may be mentioned that the same stabilisation may be obtained with a built-in pump of about 12 kw., or with a larger external installation of about 100 kw. for a water jet pump.

The design of the unit shown in FIGURE 2 should be streamlined, with smooth surfaces to minimize friction losses. If desired, the circulation can be improved by arranging more mixing chambers around the reactor core.

For the purpose of convenience the liquid volumes, pressures and velocities are given the same symbols in FIGURE 2 and FIGURE 3. Now referring to FIGURE 3, 16 is a mixing chamber which has an inlet 17 to 18 for a fraction $G_1$ of a coolant-moderator liquid in a nuclear reactor 19. The mixing chamber is placed in the coolant-moderator liquid which is at or near to its saturation temperature. The liquid flows at a mass flow rate $G_1$ into the mixing chamber via a bore 17 and through a driving nozzle 18. The driving nozzle has a diverging part which leads into the mixing chamber. In this part the liquid at mass flow rate $G_1$ at a pressure $P_1$ at saturation temperature will expand and partially evaporate with the result that a liquid-vapour mixture flows at a relatively high velocity $V_u$ into the mixing chamber.

Vapour from a vapour space 20 in the reactor is led through a tubing 21 to a separates external circuit similar to that shown in FIGURE 1. Upon giving off heat condensate is pumped at a mass flow rate $G_2$ and at a pressure $P_2$ through a tubing 22 to one or more nozzles 23 which lead into the mixing chamber 16. The condensate volume is subcooled in relation to the temperature of the coolant-moderator liquid which gives off vapour to the external circuit.

Pressure energy at the pressure $P_2$ in the subcooled condensate at a mass flow rate $G_2$ is partly transformed into kinetic energy accompanied by a corresponding pressure reduction and the condensate flows at a velocity $V_2$ into the mixing chamber.

Figure 4:
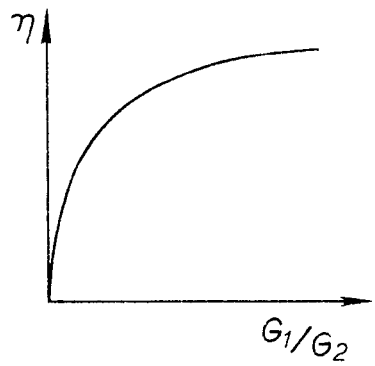
FIGURE 4 shows in principle how the efficiency of a vapour injector varies with the liquid volume of the injected vapour volume.

FIGURE 4 shows in principle the efficiency $\eta$ of a conventional vapour injector as a function of the ratio between the liquid and vapour mass flow rates in the injected fluid. As the figure shows, the efficiency increases rapidly with the liquid content of the injected fluid. An attempt has been made for the full use of this fact in the mixing chamber 16 shown in FIGURE 3. Here the liquid-vapour mixture, which enters through the driving nozzle 18, is mixed with subcooled liquid which enters through the nozzles 23, and the vapour formed condenses completely or partially on the drops which enter through the nozzles 23. Thus, a depression occurs in the mixing chamber sufficient to cause injection through the nozzles 23. However, the effect can be considerably increased by putting the condensate under pressure as is done in this embodiment.

Simultaneously with the mixing of the liquid at a mass flow rate $G_1$ with the liquid at a mass flow rate $G_2$ an impulse exchange takes place in the mixing chamber so that the fluid mixture at a mass flow rate $G_1+G_2$, a relatively high velocity $V_{12}$ and a pressure $P_{12}$ flows towards a nozzle 24 in a converging part of the mixing chamber. A part of the kinetic energy obtained is now transformed into pressure energy and the pressure $P_{12}$, which is lower than the reactor pressure, is built up to the reactor pressure $P'_{12}$ in the converging nozzle as shown in the figure, or possibly in a converging-diverging nozzle. Thus, the mixture at a mass flow rate $G_1+G_2$ flows out of the nozzle 24 at a velocity $V'_{12}$.

Figure 5:
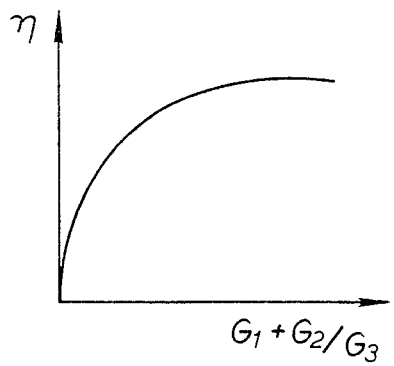
FIGURE 5 shows in principle the efficiency of a water jet pump as a function of the relation between the mass of the driving medium and the mass of the driven medium.

As shown in FIGURE 5 the efficiency $\eta$ of an ordinary water jet pump increases with the ratio between the mass flow rates of the driving medium $G_1+G_2$ and the driven medium $G_3$ at least within the expected operating range.

At the nozzle 24 an impulse exchange takes place between the outflowing fluid at a mass flow rate $G_1+G_2$ and the coolant-moderator liquid in the reactor circulating at a mass flow rate $G_3$. Thus, the coolant-moderator liquid at a mass flow rate $G_3$ a velocity $V_3$ and a pressure $P_3$ in mixture with the driving liquid at a mass flow rate $G_1+G_2$ is given an increased velocity $V_4$ and enters a directed liquid passage having a diffusor 25. In the diffusor 25 the pressure of the whole mixture at a mass flow rate $G_1+G_2+G_3$ is built up from $P_4$ to $P_5$ and the mixture enters the reactor core 26 at a velocity $V_5$.

After having passed the reactor core the liquid vapour mixture is separated. The liquid flows to the slot around the nozzle 24 and is circulated as described above, while the vapour rises into the vapour space 20. From the vapour space 20 the vapour is led out of the reactor tank through the tube 21.

By adjusting the temperature and/or the pressure of the returned condensate, the flow rate through the reactor core, and consequently the vapour volume in the reactor core, can be varied. In this way the reactivity of the reactor can be controlled.

As an illustration of the advantages of the system described in FIGURE 3 reference may be made to a reactor with a thermal power of about 53 mw. an operating pressure of 52 atm. a temperature of the return condensate of 130° C. and a consumption for pre-heating of the condensate of 13 mw. Velocity at the inlet to the reactor core of about 4 m./sec. can be obtained, while in a boiling reactor having natural circulation an inlet velocity of about 1 m./sec. can be obtained.

In comparison, it may be mentioned that the same stabilisation may be obtained with a built-in pump of about 30 kw. of electric power, or with a larger external installation of about 250 kw. of electric power for a water jet pump. The design of the unit shown in FIGURE 3 should be streamlined with smooth surfaces to minimize friction losses. If desired the circulation can be improved by arranging more mixing chambers around the reactor core.

We claim:

1. A nuclear reactor including a closed tank containing a reactor core, a volume of liquid less than the volume of the internal space of the said tank and means providing forced circulation of such liquid in a liquid flow circuit passing the said reactor core, such circulation providing means including a conduit comprising a cooling system and a pump and extending externally of the said tank from an upstream end to a downstream end of said conduit, the said upstream end extending in fluid tight manner through the wall of said tank into the upper portion of the said tank and the said downstream end extending in fluid tight manner through the wall of said tank into the lower portion of the said tank, the said means further including an elongated hollow member situated inside the said tank in the said volume of liquid and in communication with the said downstream end of the said externally extending conduit, the said hollow member defining a chamber therein and being provided, at one end, with an inlet mouth of restricted area in communication with the said volume of liquid at a point of the said liquid flow circuit downstream of the said reactor core, said inlet mouth being followed by and communicating with a portion having a diverging cross sectional area, said portion extending into and communicating with said chamber, said chamber receiving the said downstream end of the said externally extending conduit through an opening of restricted cross sectional area, communicating with the downstream end of said externally extending conduit, the said chamber being defined by converging walls and being provided with an outlet mouth at the converging end of said walls, said converging end of said walls communicating with said liquid flow circuit at a location upstream of the said reactor core, the said means further including a passage of restricted cross sectional area included in the said liquid flow circuit and encircling the said converging end of said walls.

2. A nuclear reactor including a closed tank containing a reactor core, a volume of liquid less than the volume of the internal space of the said tank and means providing forced circulation of such liquid in a liquid flow circuit passing the said reactor core, such circulation providing means including a conduit comprising a cooling system and a pump and extending externally of the said tank from an upstream end to a downstream end of said conduit, the said upstream end extending in fluid tight manner through the wall of said tank into the upper portion of the said tank above the level of liquid therein, and the said downstream end extending in fluid tight manner through the wall of the said tank into the lower portion of the said tank below the level of said liquid, the said means further including a hollow member defining a downwardly converging mixing chamber therein open at its upper and lower ends, a driving nozzle opening into the upper end of said mixing chamber and formed with an inlet mouth of restricted area in communication with the said volume of liquid at a point in the said liquid flow circuit downstream of the said reactor core, said inlet mouth being followed by and communicating with a portion of said driving nozzle having downwardly diverging cross section, said portion opening downwardly into said mixing chamber, means in said mixing chamber defining a restricted orifice around said nozzle and also opening downwardly into said chamber, said downstream end of the externally extending conduit communicating with said orifice to produce a downward flow of fluid therethrough, the open lower end of said mixing chamber defining a restricted outlet nozzle for discharge of the contents of said chamber and communicating with said liquid flow circuit at a location upstream of the reactor core, and means defining a passage of restricted cross sectional area having open inlet and discharge ends both communicating with said liquid flow circuit and oriented with the direction of flow through said circuit, said inlet end encircling said outlet nozzle for the said chamber and defining there around a restricted liquid inlet opening through which the flow of liquid from the said circuit is induced by the discharge of the mixing chamber contents through said mixing chamber nozzle.

References Cited by the Examiner

UNITED STATES PATENTS

| | | | |
|---|---|---|---|
| 294,118 | 2/1884 | Craig | 122—407 |
| 1,425,478 | 8/1922 | Hitchcock | 137—801 X |
| 2,232,727 | 2/1941 | Peterkin et al. | 137—801 X |
| 2,861,033 | 11/1958 | Treshow | 176—56 |
| 3,068,159 | 12/1962 | Borst | 204—154.2 |
| 3,103,917 | 9/1963 | Bauer et al. | 122—407 |
| 3,103,918 | 9/1963 | Huet | 122—407 |
| 3,117,422 | 1/1964 | Bauer et al. | 176—55 X |
| 3,202,584 | 8/1965 | Bogaardt et al. | 176—61 |

FOREIGN PATENTS

| | | |
|---|---|---|
| 199,766 | 9/1958 | Austria. |
| 110,230 | 10/1917 | Great Britain. |
| 796,966 | 6/1958 | Great Britain. |
| 844,475 | 8/1960 | Great Britain. |
| 875,329 | 8/1960 | Great Britain. |

OTHER REFERENCES

Rose, AEC Document WAPD-TM-227, June 1960, pp. 1-22 relied.

L. DEWAYNE RUTLEDGE, *Primary Examiner.*

CARL D. QUARFORTH, REUBEN EPSTEIN,
*Examiners.*

W. T. HOUGH, *Assistant Examiner.*